Patented June 25, 1940

2,205,395

UNITED STATES PATENT OFFICE 2,205,395

2-CHLOROALLYL ETHERS OF PHENOLS

Gerald H. Coleman, Midland, Mich., assignor to The Dow Chemical Company, Midland, Mich., a corporation of Michigan No Drawing. Application November 25, 1938, Serial No. 242,281

9 Claims. (Cl. 260—612)

This invention concerns certain new chemical compounds, namely, the aromatic ethers of 2-chloroallyl alcohol, and in particular concerns the 2-chloroallyl ethers of the monohydric phenols which contain eight or more carbon atoms. It also concerns a method of making the compounds.

The new ethers herein disclosed are usually high-boiling, colorless liquids, although they are sometimes obtained in solid form. They are substantially insoluble in water but are soluble in a number of organic solvents such as acetone, benzene, ethanol, petroleum ether, etc. They are useful as plasticizing agents for vinylidene chloride resins and may also be employed as intermediates in the preparation of a wide variety of other organic compounds.

The 2-chloroallyl ethers of the present class are prepared by heating a metal salt of a phenol containing at least eight carbon atoms (or a mixture of such a phenol and an aqueous solution of an alkali) with 2-chloroallyl chloride or with 1,2,3-trichloropropane. Any monohydric phenol containing eight or more carbon atoms, e. g., m-phenylphenol, p-ethylphenol, thymol, tri-isopropylphenol, o-cyclohexylphenol, p-tertiaryoctylphenol, alpha-naphthol, p-(2-methylcyclohexyl-)phenol, m-(4-tertiarybutylphenyl-) phenol, etc., may be employed as the phenolic reactant in preparing the new ethers. The alkali employed in the reaction is preferably an alkali metal hydroxide, such as sodium or potassium hydroxide.

In preparing the new ethers by reaction between a metal phenolate and 2-chloroallyl chloride, the reaction is preferably carried out by dissolving the phenol in an equimolecular proportion of the alkali in the form of a 5-30 per cent aqueous solution, and thereafter heating the resultant solution at reflux temperature with an approximately equimolecular proportion of 2-chloroallyl chloride. When 1,2,3-trichloropropane is employed as a reactant, two moles of alkali are used per mole of 1,2,3-trichloropropane, since the reaction involves the removal of two moles of hydrogen chloride from the 1,2,3-trichloropropane.

The reaction is usually complete in from 2 to 6 hours depending upon the particular phenolic reactant employed. Upon completion of the reaction, the mixture is cooled, washed with a dilute aqueous alkali solution to remove any unreacted phenolic material, and is fractionally distilled or crystallized to purify the ether product.

The following examples illustrate several ways in which the principle of the invention has been applied, but are not to be construed as limiting the same.

Example 1

170.0 grams (1.0 mol) of p-phenylphenol was dissolved in 290 grams of an aqueous solution containing 40 grams (1.0 mol) of sodium hydroxide. The resulting solution was placed in a flask fitted with a reflux condenser, thermometer, and stirrer, and 111.0 grams (1.0 mol) of 2-chloroallyl chloride was added drop-wise with stirring at a temperature of approximately 95° C. The mixture was then heated with stirring at approximately 98°–103° C. for 2 hours after which time it was cooled and diluted with an equal volume of water. Upon standing over night a mass of white crystals comprising the crude ether product separated out of solution. The crystals were then filtered from the liquor and were recrystallized from ethyl alcohol solution whereby the pure 2-chloroallyl ether of p-phenylphenol was obtained as a white crystalline solid having a melting point of approximately 75°–76° C. and having the formula:

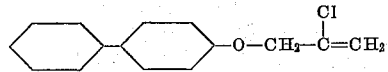

Example 2

170.0 grams (1.0 mol) of o-phenylphenol was dissolved in 280 grams of an aqueous solution containing 80.0 grams (2.0 mols) of sodium hydroxide. The solution of sodium o-phenylphenolate thus obtained was mixed with 147.4 grams (1.0 mol) of 1,2,3-trichloropropane and the mixture was heated with stirring at 80°–95° C. for 7.5 hours. The mixture was then cooled, washed with dilute aqueous sodium hydroxide and water, and was fractionally distilled under vacuum. There was obtained 158 grams of the 2-chloroallyl ether of o-phenylphenol, a colorless liquid distilling at approximately 136°–137° C. under 2 millimeters pressure, and having a specific gravity of about 1.159 at 20/4° C. and an index of refraction, $$n_D^{20} = 1.5991$$

The product has the formula:

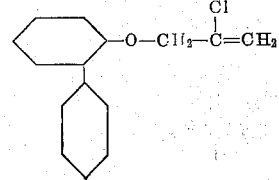

Example 3

A mixture of 176 grams (1.0 mol) of p-cyclohexylphenol, 111 grams (1.0 mol) of 2-chloroallyl chloride, and 340 grams of an aqueous solution containing 40 grams (1.0 mol) of sodium hydroxide was heated at approximately 100° C. for 2 hours as in Example 1. The reacted mixture was then cooled, washed and fractionally distilled. There was obtain 172 grams of the 2-chloroallyl ether of p-cyclohexylphenol, a colorless liquid distilling at approximately 160°–163° C. under 4 millimeters pressure, and having a specific gravity of about 1.086 at 20/4° C. The product has the formula:

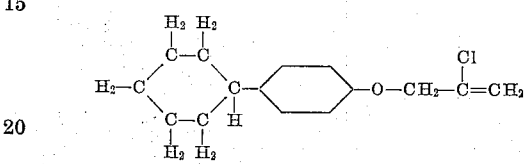

Example 4

A mixture of 150 grams (1.0 mol) of p-tertiarybutylphenol, 111 grams (1.0 mol) of 2-chloroallyl chloride, and 290 grams of an aqueous solution containing 40 grams (1.0 mol) of sodium hydroxide was heated for 2 hours at approximately 97°–103° C. as in Example 1. The mixture was then cooled, washed, and fractionally distilled whereby the 2-chloroallyl ether of p-tertiarybutylphenol was obtained as a colorless liquid distilling at approximately 120°–122° C. under 5 millimeters pressure, and having a specific gravity of about 1.144 at 20/4° C. The product has the formula:

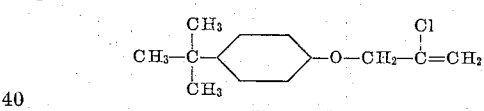

Example 5

A mixture of 122 grams (1.0 mol) of a mixture of isomeric dimethylphenols, 111 grams (1.0 mol) of 2-chloroallyl chloride, 250 grams of water, and 40 grams (1.0 mol) of sodium hydroxide was heated at a temperature of 95°–102° C. for 2 hours as in Example 1. The mixture was then washed and distilled as in Example 2 whereby a mixture of the 2-chloroallyl ethers of the isomeric dimethylphenols was obtained as a colorless liquid distilling at approximately 123°–125° C. under 10 millimeters pressure and having a specific gravity of about 1.077 at 20/4° C. This product may be expressed by the formula:

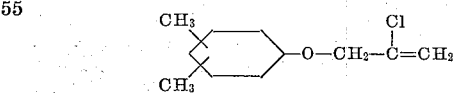

Other 2-chloroallyl ethers of the present type which may be prepared by reacting 2-chloroallyl chloride or 1,2,3-trichloropropane with phenolic compounds as hereinbefore described include the 2-chloroallyl ethers of carvacrol, 2,4-diethylphenol, m-phenylphenol, 2,4-diisobutylphenol, o-amylphenol, o-allylphenol, p-heptylphenol, 3-ethyl-5-isopropyl-phenol, 2,4,6-triethylphenol, o-cyclohexylphenol, p-decylphenol, o-(4-ethylphenyl-) phenol, 4-methylnaphthol, o-methallylphenol, etc.

Other modes of applying the principle of my invention may be employed instead of those explained, change being made as regards the method herein disclosed or the materials employed, provided the products stated by any of the following claims or the equivalent of such stated products be obtained.

I therefore particularly point out and distinctly claim as my invention:

1. A 2-chloroallyl ether of a monohydric hydrocarbon-substituted phenol, said phenol containing at least 8 carbon atoms.

2. A 2-chloroallyl ether of a monohydric phenol having the general formula:

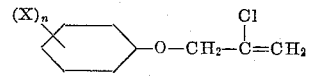

wherein X represents a hydrocarbon substituent selected from the class consisting of alkyl, alkenyl, aryl, and cycloalkyl groups, and n is an integer not greater than 3.

3. A 2-chloroallyl ether of a monohydric phenol having the general formula:

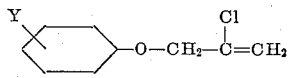

wherein Y represents an aryl radical.

4. A 2-chloroallyl ether of a monohydric phenol having the general formula:

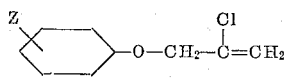

wherein Z represents a cycloalkyl radical.

5. A 2-chloroallyl ether of a monohydric phenol having the general formula:

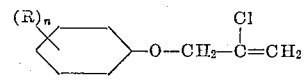

wherein R represents an alkyl radical containing at least 2 carbon atoms and n represents an integer not greater than 3.

6. The 2-chloroallyl ether of p-tertiarybutylphenol, a colorless liquid distilling at approximately 120°–122° C. under 5 millimeters pressure and having a specific gravity of about 1.144 at 20/4° C. and the formula:

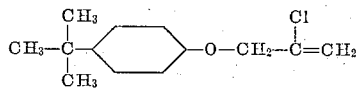

7. The 2-chloroallyl ether of p-phenylphenol, a white crystalline solid having a melting point of 75°–76° C. and having the formula:

8. The 2-chloroallyl ether of p-cyclohexylphenol, a colorless liquid distilling at approximately 160°–163° C. under 4 millimeters pressure and having a specific gravity of about 1.086 at 20/4° C. and the formula:

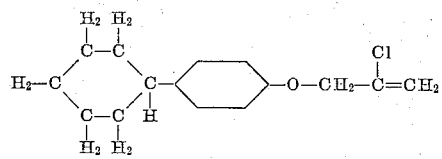

9. The method of making a 2-chloroallyl ether of a hydrocarbon-substituted phenol containing at least 8 carbon atoms which comprises reacting said phenol with 1,2,3-trichloropropane in the presence of an alkali.

GERALD H. COLEMAN.